Jan. 6, 1925.  1,522,253
F. P. MALONEY
SCRIBING SAW
Filed Oct. 24, 1921   2 Sheets-Sheet 1
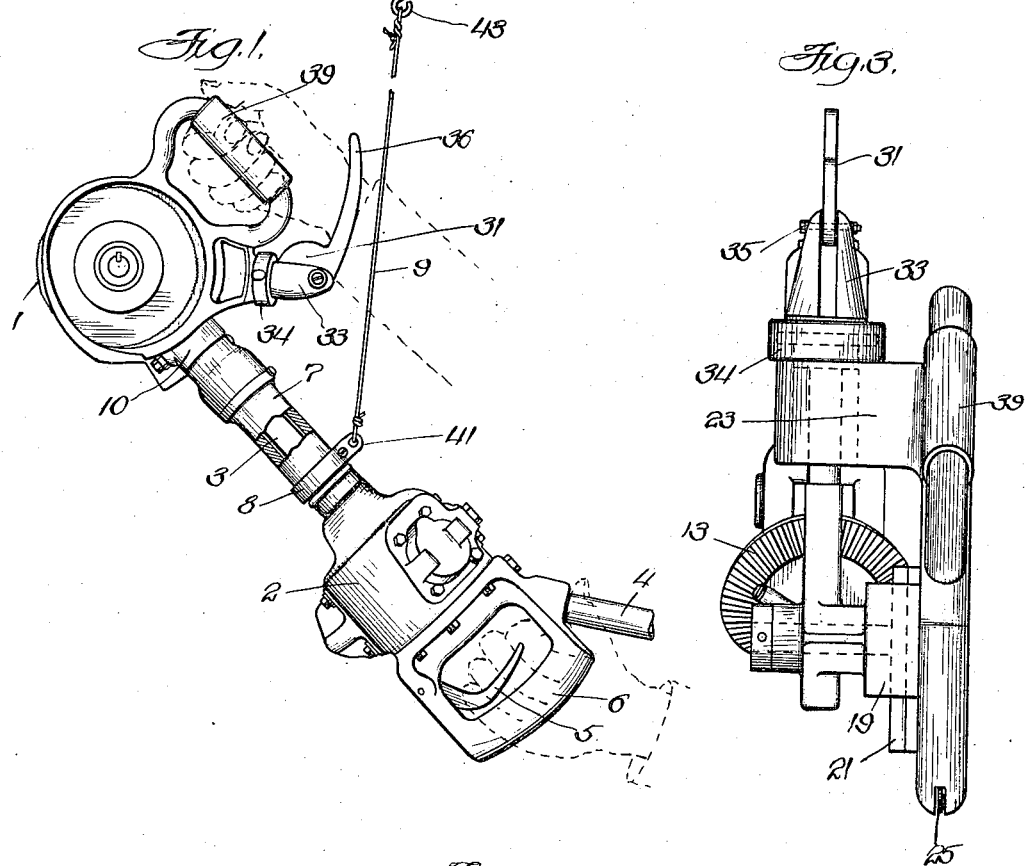
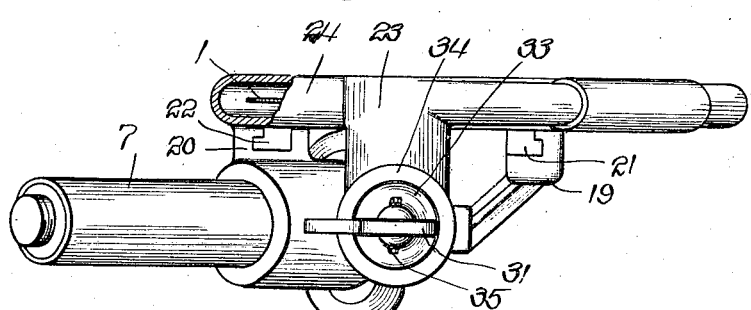
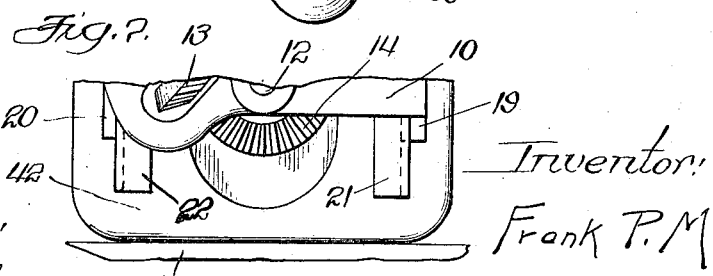
Inventor:
Frank P. Maloney
By Albert Scheible, Atty.

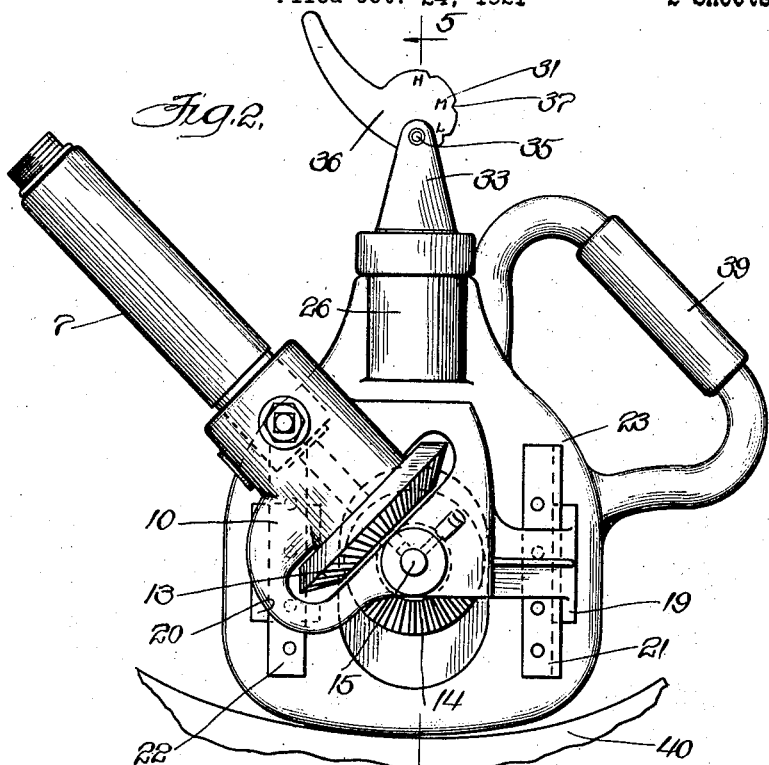
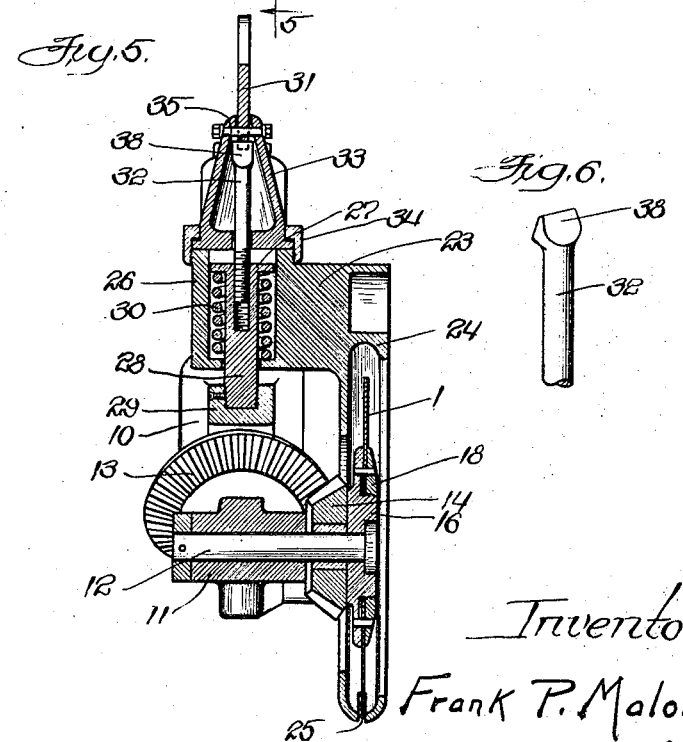

Patented Jan. 6, 1925.

1,522,253

UNITED STATES PATENT OFFICE.

FRANK P. MALONEY, OF CHICAGO, ILLINOIS, ASSIGNOR TO MORRIS & COMPANY, A CORPORATION OF MAINE.

SCRIBING SAW.

Application filed October 24, 1921. Serial No. 509,858.

*To all whom it may concern:*

Be it known that I, FRANK P. MALONEY, citizen of the United States, residing at Chicago, in the county of Cook and State of Illinois, have invented certain new and useful Improvements in a Scribing Saw; and I do hereby declare the following to be a full, clear, and exact description of the invention, such as will enable others skilled in the art to which it appertains to make and use the same.

My invention relates to scribing saws and in one of its general aspects aims to provide a sawing appliance including its own driving motor and arranged for convenient manipulation as a unit. It also aims to provide such a motor driven saw in a form which will readily permit the saw to be moved bodily in a variety of directions with relatively little effort on the part of the user, and aims to provide simple means for supporting the entire sawing unit in approximately balanced disposition so that the saw can be used advantageously in a large number of different positions without tiring the user. For this general purpose, my invention aims to provide a motor driven saw which can readily be supported by a pendulating support in substantially balanced relation with respect to its attachment to the said support, and aims to provide suitably arranged handles for effectively manipulating the saw. It also aims to arrange both the handles and the general assembly so that the user can easily determine the plane of the sawing and the line along which the saw will effect its cutting. Furthermore, it aims to provide simple means disposed convenient to the respective handles for controlling the operation of the motor and for gaging the cutting depth of the saw.

In another broad aspect, my invention relates to means for effectively determining the depth of the saw cut, aims to provide easily manipulated means for varying this depth and for latching the adjustment at predetermined points, and aims to arrange the depth gage so that the saw can be used effectively on concaved as well as flat surfaces. Still further objects will appear from the following specification and from the accompanying drawings, in which—

Fig. 1 shows a scribing saw embodying my appliance and supported in pendulating fashion for use upon a vertical or inclined surface.

Fig. 2 is an enlarged elevation of the saw end of the same appliance, taken from the rear of Fig. 1 and showing the appliance in position for scribing an object having a concave upper surface.

Fig. 3 is an end elevation, taken from the right hand of Fig. 2.

Fig. 4 is a plan view of the same part of the appliance, with a portion of the combined guard and depth gage broken away.

Fig. 5 is a vertical section taken along the correspondingly numbered line in Fig. 2, or centrally through the spindle of the saw.

Fig. 6 is an enlarged perspective view of the upper end of a plunger extension which engages the cam.

Fig. 7 is a fragmentary elevation of the lower part of the sawing end of my appliance, showing a desirable shape of the guard for use on flat surfaces.

In one of its immediate commercial applications, the appliance of my invention is particularly adapted for use in packing houses in scribing loin ribs and I am therefore illustrating it primarily in an embodiment suitable for this purpose, although I do not wish to be limited to any particular uses of my appliance or to the particular combination of the parts here disclosed. In the illustrated embodiment, my appliance comprises in a unitary assemblage a scribing saw including a circular saw 1, and a motor 2, together with driving connections between the motor and the saw, handles for conveniently manipulating the entire appliance, means for supporting it for ease of manipulation, and conveniently disposed means for controlling both the depth of the saw cut and the operation of the motor.

The motor 2, which I am here describing as being driven by compressed air, may be of any common type, being here pictured in a standard form for rotating a shaft 3 which extends from the motor to the sawing appliance proper, and shown as having compressed air supplied to it through a flexible tube 4, the supply of air being controlled by a lever 5. This lever is preferably disposed within easy reach of one or more fingers of the hand grasping a handle 6 fastened to the rear end of the motor.

Surrounding a portion of the motor shaft 3 is a sleeve 7 which is gripped by a clamp 8 having a suitable eye 41 for engaging a support. For purposes such as loin rib sawing, this support is desirably in the form of a pendant or other flexible member 9 which has its upper end engaged with some elevated support, such as a ceiling hook 43, so as to be free to swing in any direction.

At the saw end of the appliance, the sleeve 7 is fastened to a bearing member 10, here shown as a casting including suitable bearings for the forward end of the shaft 3 and also including a bearing 11 (Fig. 5) for the spindle 12 of the saw, the driving connection being made by a bevel gear 13 fastened to the motor shaft 3 and a pinion 14 fast upon the saw spindle 12 and engaging the said gear. This spindle 12 also has fastened to it a suitable head 16 arranged for holding the circular saw 1 and threaded for receiving a clamping plate 18 which clamps the saw against a correspondingly shaped part of the head 16 so as to hold the saw in a predetermined plane.

The bearing or supporting member 10 also has fast thereon a pair of guides 19 and 20 disposed parallel to each other and respectively underhanging gibs 21 and 22 which are fastened to the guard member 23. This guard member has a flange 24 curved to overhang the periphery of the saw and equipped along one edge with a slot 25 through which the saw projects when in use. Diametrically opposite the slot 25 with respect to the axis of the saw spindle, the guard member 23 has a cylinder 26 arranged with its axis radial of the spindle 12 and slidably housing the head 27 of a plunger which controls the gaging of the depth of the saw cut. This plunger has its stem 28 threaded into a nut 29 interlocked with the bearing member 10, so that a longitudinal movement of the plunger will move the bearing member with respect to the guard member. To effect such movement, I use a compression spring 30 within the cylinder 26 under the head 27 of the plunger, so that this spring will continually tend to move the plunger in a direction which is upward in Fig. 5, thus tending to slide the guard member downwardly with respect to the saw or into a position in which the overhanging flange 24 of the guard houses the entire periphery of the saw.

This movement of the plunger by the spring is resisted by a cam 31 which engages the tip of a rod 32 threaded into the head end of the plunger as an extension to the latter, the cam being desirably pivoted on a fork 33 clamped to the mouth of the cylinder 26 by a collar 34. By rotating the cam 31 more or less about the pivot pin 35 which connects it to the supporting fork 33, I can readily depress the plunger correspondingly against the resistance of the spring 30, thereby raising the guard member so that the saw can project correspondingly through the slot 25. To effect this manipulating, I provide the cam 31 with a handle 36. I also desirably provide the edge of the cam with a series of notches 37 and provide the plunger extension 32 with a wedge-shaped head 38 adapted to engage any one of these notches so that the pressure of the plunger-moving spring will lock the cam in any of its predetermined positions. By varying the depth to which the extension stem 32 is screwed into the plunger 28, I can correspondingly vary the effective total length of the plunger member, thus making the adjustment needed for variations in the length or resiliency of the spring.

To aid the operator in properly manipulating my appliance, I provide a second handle 39 on the sawing end of the latter, and desirably mount the latter handle on the guard member of the appliance and in such a position with respect to the cam that the handle of the latter can readily be reached by the hand grasping this said handle. The handles 6 and 39 are desirably in planes parallel to each other and parallel to the plane of the saw, so that the operator can readily judge the plane of the sawing from the position of these handles as well as from the overhanging edge 24 of the guard member, and the forward handle 39 desirably has its axis, in the medial plane of the saw. For use on concaved surfaces, such as loin ribs, this overhanging edge 24 desirably has its slotted portion curved on a radius greater than the radius of the saw, thereby presenting a curved edge to the surface which is to be scribed and hence permitting the scribing to be done to a predetermined depth on an irregularly concaved surface.

With the appliance thus arranged, it will be obvious from Fig. 1 that the pendulating suspension will permit the entire appliance to be swung bodily through a considerable range and that it will likewise permit the appliance to be pivotally moved about the suspension eye 41 of the clamp 8 both for swinging the plane of the saw in either direction from the vertical and for rocking the entire appliance about its said pivotal mounting in an upward or downward direction. Consequently, the user can readily adapt the position of the saw to the shape and position of the object which is to be scribed and can even do this scribing while the loin or other object is moving past him. By manipulating the cam handle 36 he can readily adjust the depth of the scribing according to the presented object and by pulling upon, or releasing, his grip on the trigger handle 5 he can instantly start or stop the driving of the saw. Likewise, by shifting the position of the clamp 8 on the sleeve 7 which houses the medial portion of the motor shaft, he can readily adjust the balance of the supported appliance so that the effective manipulating of the saw can be accomplished with very little effort. Consequently, the desired scribing cuts can be made on a large number of objects in rapid succession without unduly tiring the operator. Moreover, the entire manipulation is so simple that no specially experienced workman is required for the purpose, as the arrangement of the parts readily permits the operator to determine the position of the cutting line, while the setting of the cam definitely determines the depth of the cutting. As a further means for reducing the judgment required by the operator in setting the cam, I desirably mark the various notches on the cam to indicate the character of the objects for which each particular setting is suited. Thus I am here showing the cam notches in Fig. 2 as respectively marked "L", "M", "H" to indicate the notch setting suitable for scribing loins which are respectively light, medium and heavy.

However, while I have illustrated and described the appliance of my invention in a highly desirable embodiment, I do not wish to be limited to the details of the construction and arrangement thus disclosed, it being obvious that the same might be modified in many ways without departing from the spirit of my invention or from the appended claims. For example, I do not wish to be limited to the use of a compressed air motor, as the motor 2 might equally well be an electric motor to which current is supplied by conductors within the tube 4. Neither do I wish to be limited to the use of my depth gage arrangement in connection with a pendulatingly supported sawing appliance, nor to the use of my appliance on vertical or obliquely presented surfaces. Thus, Fig. 7 shows the sawing end of my appliance as equipped with a straight edged guard 42 adapted for use in scribing flat surfaces, such as a board 43.

I claim as my invention:

1. In a sawing appliance, an elongated sleeve, a housing having driving means therein connected to the sleeve at one end thereof, a handle connected to the housing, a shaft in the sleeve connected to the driving means, a saw carrying member connected to the opposite end of the sleeve, means to drive the saw from the shaft, means connected to the sleeve between the ends thereof for suspending the appliance, a combined depth gage and guard movably associated with the saw carrying member, a handle carried by the saw carrying member, means for adjustably controlling the combined depth gage and guard disposed adjacent the second named handle, and means for controlling the driving means disposed adjacent the first named handle.

2. In a sawing appliance, an elongated sleeve, a housing having driving means therein connected to the sleeve at one end thereof, a handle connected to the housing, a shaft in the sleeve connected to the driving means, a saw carrying member connected to the opposite end of the sleeve, means to drive the saw from the shaft, means connected to the sleeve between the ends thereof for suspending the appliance, and a handle carried by the saw carrying member.

3. In a sawing appliance, supporting means, a housing having driving means therein connected to the supporting means adjacent one end thereof, saw carrying means connected to the supporting means adjacent the opposite end of the latter, means to actuate the saw from said driving means, a handle connected to the housing of the driving means, a handle connected to the saw carrying means, and means for suspendingly supporting the supporting means at a point between the handles, the handles being spaced apart at such a distance so as to allow same to be simultaneously grasped in the respective hands of the user.

4. In a sawing appliance, supporting means, driving means adjacent one end of the supporting means, saw carrying means adjacent the opposite end of the supporting means, handles adjacent said opposite ends of the supporting means, and means to suspendingly support the structure connected to the said supporting means at a point between said handles, said handles being spaced apart such a distance so as to allow same to be simultaneously grasped in the respective hands of the user.

5. In a sawing appliance, an elongated sleeve, a housing having driving means therein connected to the sleeve at one end thereof, a handle connected to the housing, a shaft in the sleeve connected to the driving means, a saw carrying member connected to the opposite end of the sleeve, means to drive the saw from the shaft, means connected to the sleeve between the ends thereof for suspending the appliance, a combined depth gage and guard movably associated with the saw carrying member, a handle carried by the saw carrying member, a handle for controlling the combined depth gage and guard located exteriorly of and adjacent to the last named handle, and means for controlling the the driving means disposed in such position to the second named handle so as to enable the second named handle and the said controlling means to be simultaneously gripped in the hand of the user.

Signed at Chicago, Illinois, October 19th, 1921.

FRANK P. MALONEY.